Aug. 26, 1969
C. B. McKINNEY ET AL
3,463,012
PROBE SAMPLING APPARATUS
Filed Sept. 29, 1966
2 Sheets-Sheet 1
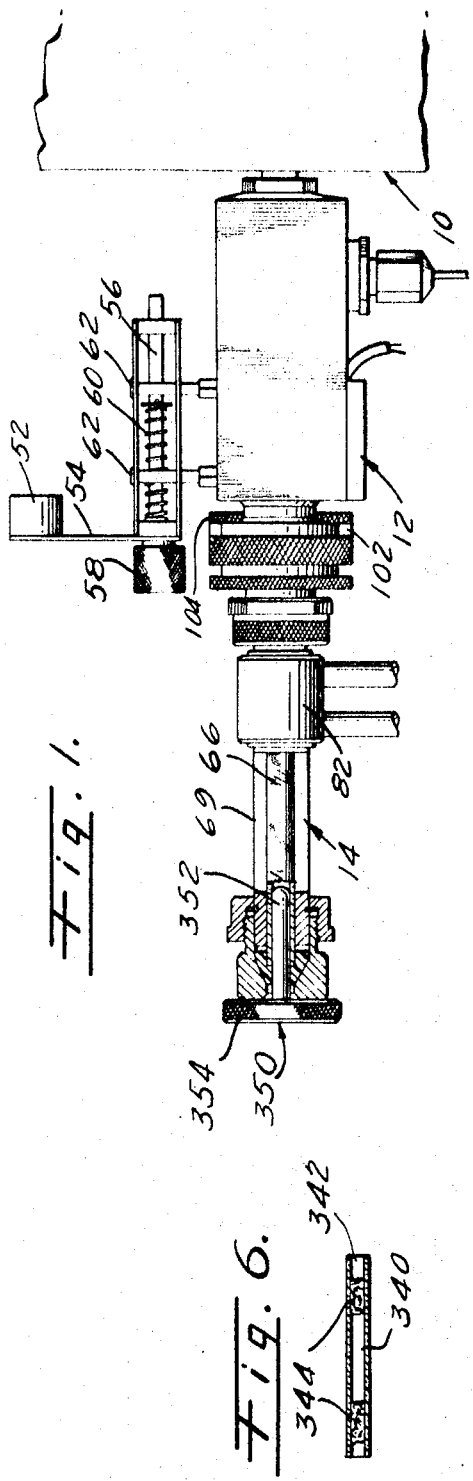
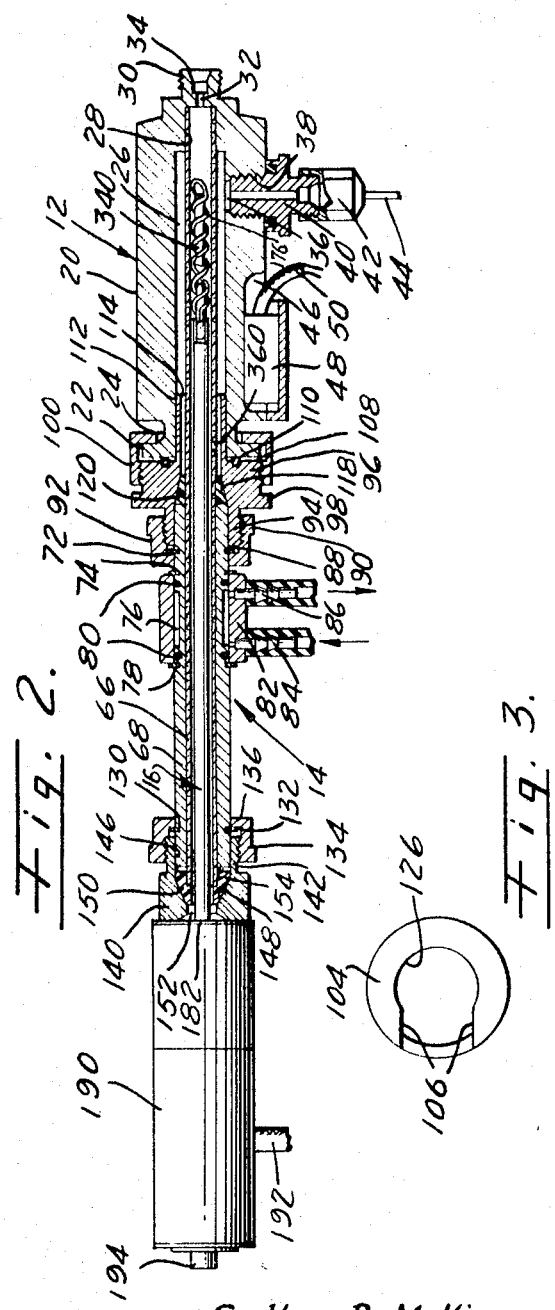
Carlton B. McKinney,
William M. Sheppard,
INVENTORS.
BY *J. C. Baisch*
Attorney

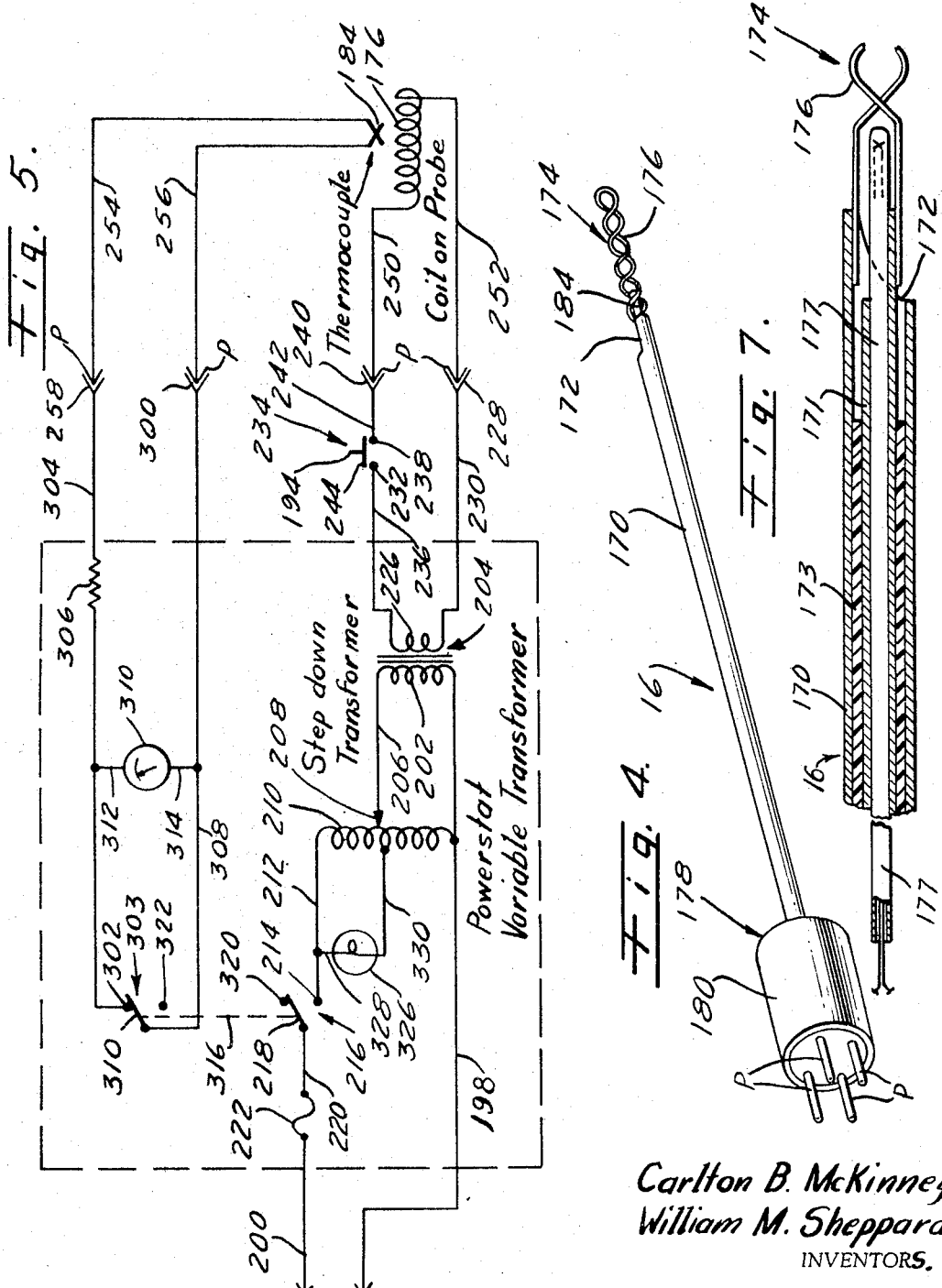

United States Patent Office 3,463,012
Patented Aug. 26, 1969

3,463,012
PROBE SAMPLING APPARATUS
Carlton B. McKinney, Los Angeles, and William M. Sheppard, Whittier, Calif., assignors to Hamilton Company, Whittier, Calif., a corporation of California
Filed Sept. 29, 1966, Ser. No. 582,934
Int. Cl. G01n *1/00, 31/00, 33/00*
U.S. Cl. 73—422
8 Claims

ABSTRACT OF THE DISCLOSURE

Apparatus for preparing samples for analysis for gas chromatography having a vaporizer tube, means for operably attaching the tube to an inlet of a chromatograph, a probe carrying a sample container for insertion into the vaporizer tube, and sealing means adjacent the outer free end of the vaporizer tube for sealing engagement with the probe which is slidable in said seal when the seal is in sealing engagement with the probe.

---

This invention relates generally to an instrument, apparatus or means for preparing samples for analysis by gas chromatography and relates more particularly to an instrument or means for handling difficult sampling problems.

While the invention has particular utility in connection with an instrument for the preparation of samples for analysis by gas chromatography, and is shown and described in such connection, it is to be understood that its utility is not confined thereto.

As is well known in the art, many materials are difficult to handle by gas chromatography and certain problems in analyzing such materials by gas chromatography are encountered. For example, many solid materials cannot be analyzed with a gas chromatograph.

It is therefore an object of the present invention to provide apparatus or means that solves such problems and the difficulties involved therein. This is done primarily with heat.

More particularly the invention comprises a gas chromatograph accessory which utilizes thermal energy, either alone or in combination with reactants or catalysts, for modifying or treating samples to render them more amenable to analysis by gas chromatography. It is especially useful for analytical pyrolysis, thermal stability studies, solids vaporization, and extraction of volatiles from various materials.

The term pyrolysis as used herein is to be understood as including thermal extraction.

It may be used with practically any gas chromatograph and provides means for handling difficult sampling problems, with no modification of the analytical portion of the gas chromatograph. It is particularly useful in connection with the inlet disclosed in applicants' copending application Ser. No. 561,085, filed June 28, 1966, and now Patent No. 3,374,660, for Inlet for Chromatographs and the Like, to provide means for handling difficult sampling problems, with easy convertibility to syringe sampling.

The apparatus of the present invention comprises an entrance lock assembly which attaches to the inlet a sample probe, and an electrical control system.

The entrance lock assembly and inlet contain the probe vaporizer tube and the inlet heater provides heat to allow operation up to a suitable temperature to prevent condensation of the sample vapor.

The sample probe comprises a support tube having a heating coil at the forward end or tip for reception of a sample tube, said probe being insertable into the vaporizer tube, the sample being vaporized in the vaporizer tube. The sample probe also is provided with a thermocouple for the heating coil.

The electrical control system supplies adjustably variable electrical power to the sample probe and has a meter read-out of sample temperature. The control system also has means for reducing needle movement of the temperature indicating instrument or meter when the instrument is not in use. This feature reduces the danger of damage to the instrument when handling or shipping.

To install the apparatus or connect it to an inlet attached to a chromatograph, the septum retainer of the inlet is swung out of the way and the septum, glass liner and vaporizer tube of the inlet are removed. Then the entrance lock is mounted on the head of the inlet by means of a clamp nut. A plug is removably sealed in the outer end of the vaporizer tube of the entrance lock.

In operation a loaded sample tube containing a sample is inserted into the coil at the tip of the probe. Thereafter the plug is removed from the outer end of the vaporizer tube of the entrance lock and the probe inserted into a holding zone—a cool location, adjacent the outer end of the vaporizer tube of the entrance lock until flow equilibrium is reestablished after insertion of the probe. When the system is stabilized the probe with the sample is moved into the inlet which has a heater. When additional heat is required current is passed through the probe coil that holds the sample tube. The resulting vapors are carried immediately and smoothly to the column of the chromatograph by the carrier gas which enters the vaporizer tube through a small side hole therein, the chromatogram thus achieved has reproducible and narrow peaks.

Still another object of the invention is to provide cooling means minimizing or preventing conduction of heat from the inlet to the holding zone.

A further object of the invention is to provide apparatus of this character wherein there is a window for the holding zone through which the probe heating coil and sample container therein may be viewed.

A further purpose of the invention is to provide apparatus of this character having exceptionally fine flow geeometry.

Another object of the invention is to provide apparatus of this character wherein the sample vapors are introduced into the chromatograph while in a heated condition, the vapors not being permitted to become cool from the time such vapors are formed until they are introduced into the column of the chromatograph.

Still another object of the invention is to provide apparatus of this character that may not only be installed easily and quickly, but may be easily and quickly removed.

A further object of the invention is to provide apparatus of this character that is effective and reliable in operation.

A still further object of the invention is to provide apparatus of this character which may be easily and quickly assembled and which may easily and quickly disassemble for cleaning, servicing and/or repair or replacement of parts.

The characteristics and advantages of the invention are further sufficiently referred to in connection with the following detailed description of the accompanying drawings which represent one embodiment. After considering this example, skilled persons will understand that many variations may be made without departing from the principles disclosed and we contemplate the employment of any structures, arrangements, modes of operations or steps of the method that are properly within the scope of the appended claims.

Referring to the drawings, which are for illustrative purposes only:

FIG. 1 is a side elevational view, with a portion broken away, of the entrance lock of apparatus embodying the invention attached to an inlet which is attached to a chromatograph;

FIG. 2 is a longitudinal sectional view of the apparatus with the probe inserted into said entrance lock;

FIG. 3 is a view of the forward end of the clamp nut of the entrance lock;

FIG. 4 is a diagramatic view of the electrical system of the apparatus;

FIG. 5 is a perspective view of the sample probe; and

FIG. 6 is an enlarged longitudinal section of a sample container; and

FIG. 7 is an enlarged longitudinal sectional view of the forward end portion of the probe.

Referring more particularly to the drawings, a chromatograph indicated generally at 10, has an inlet, indicated generally at 12 attached thereto in the usual well known manner. This inlet is disclosed in our copending application Ser. No. 561,085 referred to hereinabove. An entrance lock is indicated generally at 14 and the probe is indicated generally at 16, FIG. 2.

Not all parts of the inlet of the above referred to application need to be shown and described herein. However, some of the parts of concern herein will be described. There is a body 20 with a head 22 longitudinally spaced from the outer end of the body and connected thereto by a neck 24 of reduced diameter, the head being circular. A bore 26 extends longitudinally of the body from the outer end of the head and there is a reduced diameter bore 28 extending from the forward end of the head 26. There is a nipple 30 at the forward end of the body and a passage 32 extends from the reduced diameter bore 28 into the nipple and communicates with a discharge passage 34 in the nipple, said nipple being screwed into the chromatograph so as to be connected with the column thereof. The port 36 communicates with an enlarged tapped bore 38 normal to the axis of the body in which is disposed an input fitting 40 having a nut 42 and a carrier gas tube 44. At one side of the body there is a recess 46 for reception of a heating element 48 secured in said recess by screws or the like not shown. Electric wires 50 supply the heating element 48 with current.

The inlet includes a septum retainer 52 on an arm 54 which is connected to a shaft 56. One end of the shaft is provided with a knob 58 and a spring 60 urges the shaft, knob and septum retainer forwardly relative to the body of the inlet. These parts are suitably mounted on screws 62 and are swung out of the way when the present invention is used in connection with the inlet.

Entrance lock assembly

The entrance lock assembly includes a vaporizer tube 66 disposed in a tubular vaporizer tube support or support means 68. The vaporizer tube 66 is substantially longer than the tubular support therefor, FIG. 2, so that said vaporizer tube projects forwardly of the tubular support 68.

Tubular support 68 is provided with an annular groove 72 adjacent its forward end and rearwardly of the groove 72 there is a second annular groove 74 spaced longitudinally from the groove 72. Just rearwardly of the groove 74 is an annular groove 76 of greater length longitudinally than the grooves 72 and 74 and rearwardly of the groove 76 is a groove 78. Adjacent each end of the groove 76 is a groove for reception of respective O-rings 80 which form sealing elements for a jacket 82 which is disposed on the tubular support and encloses the groove 76 to provide a chamber for circulation of water about the tubular support 68 adjacent the forward end thereof. Snap rings are provided in the grooves 74 and 78 at each end of the jacket 82 to retain same in position over the groove 76. There are nipples 84 and 86 having end parts press fitted into bores provided therefor in the jacket 82, said bores communicating with the groove 76. A cooling fluid such as water flows into the recess 76 by way of one of the nipples such as, for example, the nipple 84 and leaves said recess by way of the other nipple, as nipple 86.

There is means for operably attaching the tube to the inlet, said means including a snap ring 88 is disposed in the groove 72 and retains an inner tube nut 90 on the tubular support 68. The inner tube nut 90 has a forwardly extending flange portion 92 that is internally threaded for reception of reduced diameter externally threaded portion 94 of an adaptor fitting 96, said adaptor fitting 96 having knurled flange 98 adjacent the outer rear end thereof. The adaptor fitting 96 is provided with external threads for threadable reception of a tubular clamp nut 100 which has an arcuate slot 102 and an inwardly extending arcuate flange 104 at the forward end, the ends 106 of said flange being spaced apart and being generally parallel with each other. It is to be noted that the exterior of the clamp nut is knurled.

The forward face 108 of the adaptor fitting is provided with an annular groove axially arranged relative to said fitting and an O-ring 110 is disposed in said groove and adapted to sealingly engage adjacent face of the head 22 of the inlet body. Intergral with and extending forwardly of the adaptor fitting is a barrel 112 that is disposed in an adjacent portion of the bore 26 of the inlet body 12. There is a bore 114 which extends through the adaptor fitting, including the barrel thereof, the inside diameter of said bore 114 being greater than the outside diameter of the vaporizer tube which extends through said adaptor fitting bore.

An inwardly tapered recess 118 is provided in the rear end of the adaptor fitting and has disposed therein frustoconical ferrule or tubular seal 120 which is of any suitable material such as, for example, Teflon and termed herein an adaptor ferrule. (Teflon is Du Ponts registered trademark for its family of fluorocarbon resins.)

With the vaporizer tube disposed in the tubular support 68 and extending into the bore 26 of the body 12 and into the reduced diameter bore 28 the bore 26 comprises an annular chamber about the vaporizer tube. The ferrule 120 provides a seal for the vaporizer tube. When the inner tube nut is connected to the externally threaded reduced diameter part 94 of the adaptor fitting the forward adjacent end of said tubular support engages the adjacent larger end of the adaptor ferrule and by tightening the inner tube nut said tubular support is forced against the adaptor ferrule and because of the tapered shape of the recess 118 in which said adaptor ferrule is disposed the adaptor ferrule is compressed tightly about the vaporizer tube. The pressure of the tubular support against the adaptor ferrule is effected through the snap ring 88 against which the inner tube nut operably acts.

Attachment of the entrance lock assembly to the body of the inlet 12 is effected by means of the clamp nut 100 which is placed over the head 22 of the inlet body 20. The slot 102 of the clamp nut is of sufficient extent to permit said clamp nut to receive the head 22 and the space between the ends 106 of the flange 104 of the inlet nut permits the neck 24 to pass into the central opening 126 defined by the flange 104 of the clamp nut. With the nut thus positioned and tightened on the adaptor fitting the entrance lock assembly is securely and sealingly attached to the inlet.

Adjacent its outer end the tubular support 68 is provided with an annular groove 130 for reception of a removable snap ring 132 similar to the other snap rings herein above mentioned, providing a reaction element for an outer tube nut 134 which is tubular and internally threaded, there being a wall 136 at the forward end of said nut for engagement with snap ring 132. A cap 140 has a forwardly projecting reduced diameter portion 142 that is externally threaded and threadably received in the outer tube nut 134. The bore 146 extends rearwardly from the forward end of the reduced diameter portion 142 of the cap 140 and connects with a inwardly tapered recess 148 which is larger at the forward end than at the rear end and in which is disposed a cap ferrule 150 of any suitable material such as, for example, Teflon. The ferrule 150 is frustoconical in shape for operable reception in said recess 148 which is open rearwardly as at 152. The cap ferrule also has a recess 154 in its forward end for slidable reception of the adjacent rear end portion of the vaporizer tube. When the outer tube nut is tightened on the cap 140 the cap ferrule 150 is compressed, the adjacent end of the vaporizer tube being forced against the shoulder at the inner end of the recess 154 of said cap ferrule. Cap ferrule 150 also serves as a probe sealing means, as further described hereinafter, which is located at the outer free end of the vaporizer tube.

The probe

The probe 16, FIGS. 2, 4 and 7 comprises an outer stem 170 of any suitable metal, such as stainless steel for example, and has a cut away portion 172 at its forward end. Within stem 170 is an inner metal tube 171, there being a tube 173 of suitable insulating material, such as Teflon, for example, on the inner tube 171 thereby insulating the metal tubes 170 and 171 from each other. An adhesive is provided between the insulating tube 173 and the metal tubes 170 and 171 thereby providing sealing means between these parts. Any suitable adhesive may be used such as, for example, an epoxy adhesive of well known character.

A heating element, indicated generally at 174, is provided at the forward end of the probe. This heating element may be of any suitable character but is shown as a bifilar coil of suitable electrical resistance wire 176. One end of the wire 176 is secured to the adjacent end of stem or outer tube 170 by brazing or other suitable means while the other end of said wire 176 is similarly secured to the adjacent end of the inner tube 171. Thus the metal tubes 170 and 171 serve to conduct electricity to the resistance wire 176 and are to be considered as part of the wires connecting said resistance wire with the step down transformer, shown in the wiring system of FIG. 5. At the rear end of the stem 170 of the probe there is an electric plug, indicated generally at 178, comprising a hollow casing 180. The rear end of the outer stem 170 of the probe is welded or otherwise suitably secured to a plate 182 which is removably attached to the adjacent end of the casing 180 as by screws, not shown. The rear ends of the metal tubes 178 and 171 are connected by wires, not shown, to respective prongs P at the free end of said plug, the plug being provided with suitable insulating material therein. Disposed within the inner tube 171 is a tube 177 of quartz or other suitable material such as a heat resistant glass, this quartz tube is 177 having its forward end closed and projecting into a rear end portion of the heating coil 176. The opposite end of said quartz tube 177 is open and suitable sealing material is provided between said tube 177 and the inner metal tube 171, such sealing material may be the same as that used for sealing means between the insulating tube 173 and the inner and outer metal tubes 170 and 171. Within the forward closed end of the quartz tube 177 is a thermocouple element 184. The wires for said thermocouple extending through said quartz tube 177, and out the open rear end of said tube 177 and are connected to respective prongs P of said plug.

There is a socket, indicated generally at 190 in FIG. 2, having a cord 192 for connection to a source of electric current. The socket 190 is provided with socket elements, not shown, for the respective prongs P of the plug 178 and there is a normally open push button switch having a movable switch member connected with a plunger 194 which is adapted to operate said switch member. This switch controls the power to the probe heating coil 176. In FIG. 5 there is shown the electrical system for the present apparatus, the parts of this system shown in the square defined by the dash lines being disposed in a suitable housing.

Wires 198 and 200 are connected to a source of electric power of any well known suitable character. Wire 198 is connected with one side of the primary coil 202 of a step down transformer, indicated generally at 204. The opposite end of the primary coil 202 is connected by means of a wire 206 with a movable contact member 208 of a variable transformer termed herein a powerstat. The movable contact member 208 is adapted to operably connect with a coil 210 of the transformer of powerstat, one end of said coil being connected to the wire 198, the opposite end of said coil being connected by means of a wire 212 with a fixed contact member 214 of a switch, indicated generally at 216. Switch 216 has a movable contact member 218 connected by means of a wire 220 with a fuse indicated generally at 222, said fuse also having an operable connection with the wire 200.

A secondary coil 226 has one end connected with a socket 228 by means of a wire 230 while the opposite end of said secondary coil is connected with a fixed switch member 232 of a push button switch, indicated generally at 234 by means of a wire 236. A second fixed contact 238 is connected to a socket 240 by means of a wire 242. Switch 234 is normally open and is provided with a movable contact member 244 which is actuated by means of the push button 194. When push button 194 is pressed the movable switch member 244 switches the fixed switch members 232 and 238 to complete the electric circuit. Switch 234 and socket 228 and 240 are disposed in the socket 190. The respective prongs P are disposed in the plug 178 and are adapted to be removably inserted or connected with the respective socket 228 and 240. Prongs P are connected by respective wires to 250 and 252 with respective ends of the heating coil 176 of the probe.

Thermocouple 184 is operably connected to respective prongs P by means of wires 254 and 256. Prongs P for the thermocouple are movably received in sockets 258 and 300 respectively which are located in the socket 190, said prongs P being carried by the plug 178. Socket 258 is connected to a fixed contact member 302 of a shorting switch indicated generally at 303, there being a resistance element 306 nippled in the line or wire 304. Socket 300 is connected by means of a wire 308 with a movable contact member 310 of said switch 303. A temperature recording meter or temperature recording instrument 310 has affable connections 312 and 314 with the wires 304 and 308 respectively.

Switches 216 and 303 have movable contact members 218 and 310 connected together in any suitable well known manner, the dotted line 316 indicating this connection. These switches are so connected that when the movable switch member 218 of the switch 216 is disconnected with the fixed contact member 214 and rests against a stop 320 of any suitable character the switch 303 is closed, that is the movable contact member 310 thereof is in contact with fixed contact member 302. When the switch 216 is closed the switch 303 is open, the movable contact member 310 of said switch 303 then being in engagement with the stop 322 which also is of any suitable well known character. An indicator light 326 is provided for the probe coil circuit and has a connection 328 with the wire 212 and the connection 330 with a suitable part of the coil 210 of the powerstat or variable transformer.

Sample container

A sample container 340, FIGS. 2 and 6, is of quartz or suitable temperature resistant glass and may be of various types of construction. In the arrangement shown in FIG. 6 the sample container is tubular and has a longitudinally extending passage 342 therethrough. The sample which may be of the solid material such as rubber, for example, is disposed in the passage 342. Some types of samples may require the use of quartz wool, as indicated at 344 to contain the sample in the container or tube 340.

The plug

A plug, indicated generally at 350 comprises a rod 352 adapted to be inserted into the outer end of the vaporizer tube through the tap barrel and opening 152 in the tap 140. Plug 350 has an enlarged disc like head 354 that is peripherally knurled. When plug 350 is disposed in the entrance lock, as shown in FIG. 1, the outer tube nut is tightened to tighten the cap barrel 150 about the stem of rod 352 of the plug.

Preparatory to the operation of the probe carrier gas is introduced into the bore 26 which may be termed an annular chamber, said carrier gas flowing through the outer end of the bore or chamber 26, through the angular space 114 between the vaporizer tube and the barrel 112 of the adaptor fitting and thence through the opening 360 in the vaporizer tube. The carrier gas then flows through the vaporizer tube and the passages or passage means through the nipple 30 and into the column of the chromatograph or analyzing instrument.

It is to be noted that the tubular support 68 is provided with cut away portions 69 providing longitudinally extending openings so that the adjacent part of the vaporizer tube will be visible. In other words the tubular support is provided with windows and since the vaporizer tube is of transparent material such as quartz, or suitable glass that will resist relatively high temperatures the interior of that portion of the vaporizer tube exposed by the windows may be seen.

This part of the entrance lock comprises a holding zone or cool place and the circulation of water through the recess 76 serves to help retain the holding zone at a relative cool temperature.

Inlet conditions

The inlet temperature may be set at any suitable desired temperature. By way of example it may be approximately 200° C. although it may be of any other suitable temperature. This inlet temperature may be monitored by the thermocouple, not shown, in the hole provided therefor on the inlet body near the heater. The temperature of the inlet is sufficient to prevent condensation of higher molecular weight components of the sample. The carrier gas flow is set at a rate appropriate to the chromatograph.

Probe sample loading

A loaded sample tube is inserted into the heating coil 176 at the forward tip of the probe. The coil grips the sample tube securely enough to prevent its falling or shaking out during operation. Thus the coil 176 serves as a holder means for a sample tube or container as well as a heating means for heating the sample in the sample tube.

Probe insertion

The cap 140 of the entrance lock is loosened and the plug 350 removed. The probe is then inserted until the sample tube is at about the center of the window of the tubular support. Cap 140 is then tightened. The carrier gas that escaped during this procedure serves to keep the system purged.

The powerstat or variable transformer is then set to an appropriate value. It is to be understood that at this time the heating element 48 of the inlet is in operation.

Sampling

When carrier gas flow has stabilized the probe is pushed all the way into the inlet so that the sample is disposed within the vaporizer tube portion in the inlet bore 26.

For some applications the temperature of the inlet alone may be high enough to extract the desired volatiles from the sample. However, if additional heat is required the button 194 of the push button switch 234 is pressed to close said switch and provide electric current to the probe coil 176 in which the sample container is disposed. The current flows through the probe coil while the button is held and the amount is determined by the powerstat setting. The temperature of the sample container and hence the sample is continuously indicated by a meter 310. Pyrolysis usually is at temperatures of from 500° to 800° C. for ten to sixty seconds.

The probe should be left in the inlet to minimize flow disturbance while the analysis proceeds.

These temperatures are by way of example and also the time indicated is by way of example.

Summary of operation

In operation the sample is placed in a sample container or tube which is then placed in the bifilar coil 176 at the tip of the probe. With the outer tube nut 134 loosened the probe is introduced or inserted into the entrance lock attached to the inlet and the outer tube nut tightened. The cap ferrule 150 is then compressed on the probe to effect a seal thereabout in the manner similar to a sealing engagement on the plug 350. However, the probe is longitudinally slidable in the cap ferrule when the latter is sealingly compressed on said probe. when the system is stabilized the probe with the sample is moved or pushed into the inlet. It is to be noted that the probe tip with its coil and sample tube therein initially is disposed in the cool or holding zone until the carrier gas flow becomes stabilized, it being understood that the inlet is suitably heated when the probe is pushed or moved forwardly to position the sample container in said inlet. When additional heat is required the push button switch 234 is closed so that current is passed through the coil 176 holding the sample tube. The resulting vapors are carried immediately and smoothly to the column by carrier gas entering through the side hole 360 of the vaporizer tube, and the chromatogram thus produced has reproducible and narrow peaks.

When the shorting switch 303 is open the meter 310 functions normally to record or indicate the temperature sensed by the thermocouple 184. However, when the apparatus is not in use the switch 216 is open and the switch 303 is closed to short the thermocouple electric system. The purpose of this arrangement is to reduce any movement of the needle of the meter 310 should the device be moved about thus minimizing danger of damage to the instrument or meter 310. It has been found that this arrangement is highly effective to minimize danger of damage to the meter when the device is shipped, for example.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and we do not wish to be restricted to the specific form shown or uses mentioned.

We claim:

1. In sampling apparatus for preparing samples for analysis by gas chromatography and the like, entrance lock means comprising:
   (A) a vaporizer tube;
   (B) support means for said vaporizer tube;
   (C) means for operably attaching said tube to an inlet for an analyzing instrument;
   (D) probe sealing means at the outer free end of the vaporizer tube, said sealing means being adapted to have a sliding seal with a probe inserted into said vaporizer tube;
   (E) and a probe comprising a stem having holder means for a sample container at the forward end, said probe being slidably and removably disposed in said vaporizer tube.

2. The invention defined by claim 1 wherein said holder means comprises an electric heating element in which the sample container is removably disposed.

3. The invention defined by claim 2 wherein the heating element comprises an electrical heating coil adapted to grip a sample tube disposed therein.

4. The invention defined by claim 2 wherein the probe comprises an inner and outer metal tubes insulated from each other and there is an inner tubular capsule of heat resisting material within the inner metal tube, said capsule being closed at its forward end, a forward end portion of said capsule extending into a rear end portion of the electric heating element; a thermocouple operably disposed in the forward end of said capsule; and electric wires for the thermocouple extending through said capsule, said heating element being operably connected to said metal inner and outer tubes.

5. The invention defined by claim 2 wherein there are electric connections of an electric circuit connected to the electric heating element, and a switch incorporated in the electric circuit for controlling electric current to said heating element.

6. The invention defined by claim 5 including a thermocouple operably disposed relative to the electric heating element of the probe, electric circuit means for said thermocouple; a temperature indicating meter in the electric circuit of the thermocouple; a switch in the thermocouple circuit arranged in parallel with the meter for shorting the thermocouple circuit; and means interconnecting the switch of heating element circuit and the switch of the thermocouple circuit, said switches and connection being arranged so that the thermocouple circuit switch is closed when the heating element switch circuit is open and vice versa.

7. In sampling apparatus for preparing samples for analysis by gas chromatography and the like, entrance lock means comprising:
(A) a vaporizer tube;
(B) support means for said vaporizer tube;
(C) means for operably attaching said tube to an inlet for an analyzing instrument;
(D) probe sealing means at the outer free end of the vaporizer tube, said sealing means being adapted to have a sliding seal with a probe inserted into said vaporizer tube;
(E) means for heating an outlet end portion of the vaporizer tube;
(F) said means for heating an outlet end portion of the vaporizer tube comprises a body of good heat transferring material having a bore therein for reception of said outlet end portion of the vaporizer tube, said body being adapted to be removably and operably secured to an analyzing instrument;
(G) and heating means for said body.

8. The invention defined by claim 7 wherein said body comprises the body of an inlet for chromatographs, said bore being of greater diameter than the outside diameter of the vaporizer tube to provide an annular chamber for a carrier gas, there being gas inlet means for said chamber for entrance of carrier gas and said vaporizer tube having an orifice therein for flow of carrier gas from said chamber into said vaporizer tube.

References Cited
UNITED STATES PATENTS

| | | | |
|---|---|---|---|
| 2,991,647 | 7/1961 | Harris | 73—23.1 |
| 3,177,700 | 4/1965 | Sier | 73—19 |
| 3,205,700 | 9/1965 | Lively et al. | 73—19 |
| 3,205,711 | 9/1965 | Harris. | |
| 3,327,520 | 6/1967 | Stapp | 73—23.1 |

LOUIS R. PRINCE, Primary Examiner

DANIEL M. YASICH, Assistant Examiner

U.S. Cl. X.R.

23—253